March 1, 1938.    B. C. PLACE    2,109,576
FASTENER
Filed April 6, 1935

Inventor
Bion C. Place
Strauch + Hoffman
Attorney

Patented Mar. 1, 1938

2,109,576

UNITED STATES PATENT OFFICE 2,109,576

FASTENER

Bion C. Place, Detroit, Mich., assignor of one-half to George E. Gagnier, Detroit, Mich.

Application April 6, 1935, Serial No. 15,079

2 Claims. (Cl. 85—5)

This invention relates to a spring stud fastener designed particularly for use in situations in which a fastener is required having holding means spaced a substantial distance from the head of the fastener.

More particularly, the invention relates to a spring stud fastener having a relatively long shank consisting only of two legs having means at their ends designed to be sprung through an aperture in the support with which the fastener is to be engaged.

In many situations, it is desirable to use a spring stud fastener that will provide a fixed or definite holding shoulder at a point that may be substantially spaced from the head of the fastener. Also when spring stud fasteners are used in situations, in which the holding part of the stud is visible or projects into a space that is accessible, it is desirable that the projection of the holding part of the fastener extend away from the structure with which it is engaged only a minimum amount or distance and that the holding part of the fastener be free of protruding exposed ends.

In the construction of closed automobile bodies it is customary to attach a silencer pad to the metal dash that separates the body from the motor. The silencer pad is covered and concealed from view by a covering of suitable finish material, said material and the pad being secured to the dash by fastening means that passes into the space in which the engine is located under the hood of the automobile. In this situation, it is desirable to be able to secure the finish material and the silencer pads, which may be quite thick, to the dash by means of spring stud fasteners. The ends of said fasteners, when used in this connection, project into the space beneath the hood of the automobile.

The present invention provides an improved spring stud fastener that is peculiarly adapted for use in situations such as that described. The fastener of the present invention provides a long straight shank that may be constructed in any length, required by the thickness of the finish material and the silencer pad through which it passes, and provides holding means at the end of the shank that projects into the space occupied by the motor a minimum amount and without presenting any exposed ends within said space.

The primary purpose of the present invention, accordingly, is to provide a spring stud fastener having a shank that may be constructed in any length without affecting the holding power of the fastener, and to provide a fastener that passes only slightly beyond the supporting structure with which it is engaged and that presents no exposed ends in the space at the side of the supporting structure opposite from that with which the material secured by the fastener contacts.

Still another object of the invention is to provide a fastener, of the type that includes a shank consisting only of two legs, in which the holding means is provided by hooks formed at the ends of the legs, the hooks being designed to have a width exceeding the diameter of the aperture in which the hooks are sprung.

Another object of the invention is to provide an improved spring stud fastener having a shank consisting only of two straight legs, each of which carries a hook at its end, the legs being spaced apart a distance approximating the diameter of the aperture in which the fastener is intended to be sprung so that said legs will bear against opposite sides of the wall forming the aperture.

Further and more specific objects of the invention will appear as the description thereof proceeds with reference to the accompanying drawing in which.

Like reference characters indicate like parts throughout the several figures.

Figure 1:
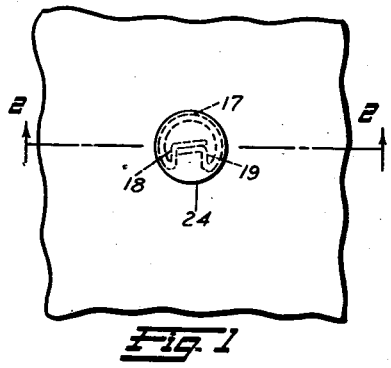
Figure 1 is a plan view of a fragment of finish material held upon a support by a fastener of the present invention.

The spring stud fastener of the present invention comprises a head 15 and a shank 16. Aside from a sheet metal cap presently to be referred to, the head and shank of the fastener is constructed from a single piece of wire which is bent into the desired form and subsequently tempered to provide the fastener with the proper degree of resilience. The mid-portion of the piece of wire, from which the fastener is constructed, is bent into the form of an open loop 17 (Figure 1) preferably circular. The head of the fastener also includes arms 18, 19, disposed in the plane of the loop 17, the arms 18 and 19 carrying legs 20 and 21 which alone constitute the shank of the fastener. The ends of the legs 20 and 21 are bent to provide open hooks 22 and 23, the tips of the free arms of which constitute the parts of the shank that engage the surface of the support presently to be referred to.

It will be understood that the arm 19, leg 21 and hook 23 are formed from one end of the wire, while the arm 18, leg 20 and hook 22 are formed from the other end thereof by bending said ends into the forms illustrated.

The legs 20 and 21 are long and straight and parallel when the legs are in their normal position or the position in which the fastener is not in use. The hooks 22 and 23 are disposed in side-by-side relation, the leg 20 serving to close the opening in hook 23, whereas the leg 21 serves to close the opening in hook 22. In view of the side-by-side relation of the hooks, it will be observed that, in the fastener of Figures 4, 5 and 6, the ends of the piece of wire from which the fastener is constructed are not exposed so that the fasteners do not become tangled with each other during handling of quantities thereof. Preferably, the frame of the head of the fastener, formed by the loop 17, is covered by a sheet metal cap 24, the edges of which are crimped or bent around the loop whereby the head of the fastener is given a finished appearance.

Figure 2:
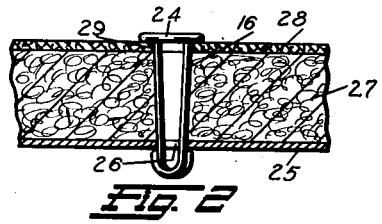
Figure 2 is a cross-sectional view taken on the plane indicated by the line 2—2 of Figure 1, looking in the direction of the arrows.
Figure 3:
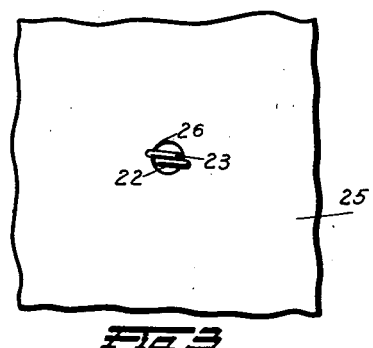
Figure 3 is a view of the fragment appearing in Figure 1 as seen from the back of said figure.

The spring stud fastener just described is intended particularly for securing relatively thick material upon a support and is useful even if the aperture in the support is formed through thick material, such as wood, because the shank of the fastener can, it will be observed, be constructed in any length without affecting the effectiveness of the holding action thereof. The use for which the fastener is particularly effective is the securing of dash silencer pads and trim material to an automobile dash that serves to separate the body of the vehicle from the space beneath the hood in which the motor is located. The fastener is shown applied to this use in Figures 1, 2 and 3 of the drawing, but it will be understood that the fastener can be used in any analogous situation.

Referring to Figures 1, 2 and 3, 25 designates a fragment of the dash which generally is constructed of metal. The dash is provided with an aperture 26 for the reception of the holding part of the spring stud fastener; 27 designates the silencer pad, which may be constructed of any suitable material, such as jute fibers or the like, which may be held together in pad-like form by paper or in any other way. In order to present a finished appearance to the interior of the automobile body, a sheet of trim material 28 generally covers the silencer pad 27. Said trim material may be a relatively stiff fibre board provided with a finished exterior appearance. The finish material is provided with an opening 29 registering with the aperture 26 in the support and the silencer pad may be perforated in any way to permit the shank of the spring stud fastener to be passed through the opening 29 through the silencer pad into the aperture 26 in the support.

The width of the hook at the end of the arms 20 and 21 of the fastener, is made to substantially exceed the diameter of cross dimension of the aperture 26 in the support 25. With this arrangement, when the silencer pad and finish material is applied to the support, it is only necessary to apply pressure to the head of the fastener in the direction normal thereto. The ends of the leg 21, and the hooks carried thereby are thus forced into the aperture 26, the rounded surface of each hook presenting a round wedge that enters the aperture when force is applied in a direction of the length of the shank of the fastener. Inasmuch as the width of the hook exceeds the diameter or cross dimension of the aperture, the free side of each hook is bent toward the leg that carries it permitting the hook to pass through the aperture. As soon as the tips of the hooks pass the remote side of the dash, the hooks resume their normal condition wider than the diameter of the aperture, the tip of the hooks then engaging said side of the support. At such times the legs 20 and 21 are bent from the original or dotted line position, illustrated in Figure 4A, to the full line position illustrated in said figure. As a result when the fastener is in applied position the legs 20 and 21 have a tendency to spread or to assume their normal position and they yieldingly engage the wall of the aperture 26, such engagement serving to maintain the hooks in position with the tips engaging the remote side of the dash.

It will be observed that the protrusion of the fastener beyond the remote side of the dash is relatively slight and that since the ends of the piece of wire contact with said side, the fastener presents no unprotected points at said side of the dash. If it is desired to remove the fastener for any reason this may be brought about by contracting the hooks so that they may be forced through the aperture in the reverse direction.

Figure 6:
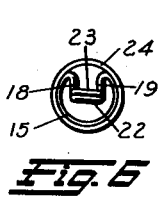
Figure 6 is a view of the fastener of Figures 4 and 5, as seen when looking along the shank of the fasteners.
Figure 9:
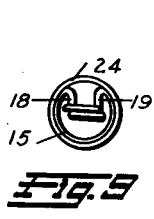
Figure 9 is a view similar to Figure 6 illustrating the fastener of Figures 7 and 8.
Figure 7:
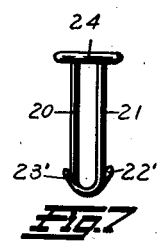
Figures 7 and 8 are side elevational views corresponding respectively to Figures 4 and 5, but illustrating a modified form of fastener.
Figure 8:
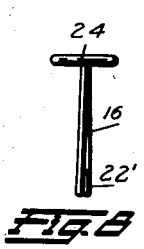

In the form of the invention illustrated in Figures 7, 8 and 9, a fastener is illustrated in which the hooks 22' and 23' exceed in width the spacing of the legs 20 and 21. In other respects the fastener of these figures is the same as that illustrated in Figures 4, 5 and 6. However, it will be understood that in the fastener of Figures 7, 8 and 9, the width of the shank of the fastener may correspond to the diameter of cross dimension of the aperture in which the fastener is used, and that when such correspondence exists, the legs 20 and 21 do not bend, placing the arms 18 and 19 under torsion when the legs move, as illustrated in Figure 4A. Engagement of the fastener with the support is brought about simply by bending the free side of each hook towards the leg that carries it during the passage of the end of the shank of the fastener through the aperture. The tips of the hook engage the remote side of the dash in the manner previously described when the hook is completely passed therethrough. When the width of the shank of the fastener corresponds to the diameter or cross dimension of the aperture, it will be understood that the passage of the fastener through the aperture requires less force since no substantial bending of the legs to carry the hooks is required, but only a bending of the free side of the hook toward the leg that carries it.

Figures 4, 5:
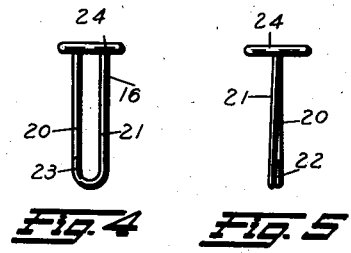
Figure 4 is a side elevation of the preferred form of spring fastener of the present invention.
Figure 5 is a side elevational view of the fastener illustrated in Figure 4 as seen when the fastener of Figure 4 is shifted through an angle of 90 degrees.
Figure 12:
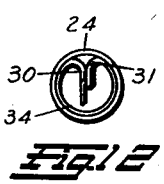
Figure 12 is a view similar to Figure 6 of the fastener illustrated in Figures 10 and 11.
Figures 10, 11:
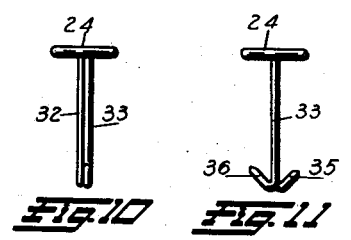
Figures 10 and 11 are side elevational views corresponding to Figures 4 and 5 but showing a further modification of the present invention.
Figure 4A:
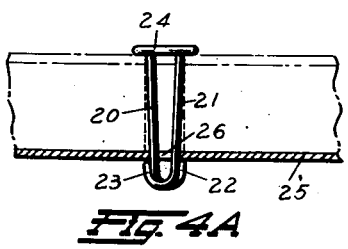
Figure 4A is a diagrammatic view showing the end of the spring fastener stud of Figure 4 entered in an aperture in a support and illustrating in dotted lines the position of the legs of the shank of the fastener prior to the entry of the end thereof in said aperture.

It will be observed that in the form of the invention illustrated in Figures 4, 5 and 6, as well as that illustrated in Figures 7, 8 and 9, the legs 20 and 21, adjacent the head are disposed in side-by-side relation and that said legs then diverge slightly from a side-by-side relation so that the hooks carried by the ends thereof may freely pass each other and move in parallel planes. In Figures 10, 11 and 12, a further modified fastener is shown in which the arms 30 and 31 in the plane of the head of the fastener are brought close together and carry legs 32 and 33 that are located in closely spaced side-by-side arrangement adjacent the head 34. The legs 32 and 33 carry respectively hooks 35 and 36, which in this instance are not closed even in part by a portion of the other leg as in the other forms of the invention.

Figure 13:
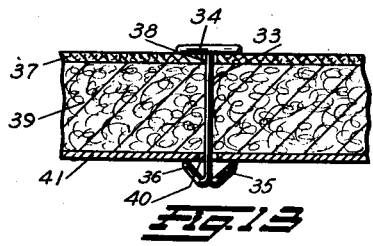
Figure 13 is a sectional view illustrating a fastener such as illustrated in Figures 10, 11 and 12 applied for the purpose of securing finish material and a silencer pad to a suitable support having an aperture.

An application of a fastener of Figures 10, 11 and 12 is illustrated in Figure 13 in which the fastener of said Figures 10, 11 and 12 passes through a sheet of trim material 37 having an opening 38 for the passage of the fastener through a silencer pad 39, and through an aperture 40 of a dash 41 in the manner previously described. In the applied position of the fastener it will be observed that the tips of the hooks 35 and 36 contact with the remote side of the dash holding the parts in assembled relation, though in this form of the invention the legs do not contact with the wall of the aperture 40.

Figure 14:
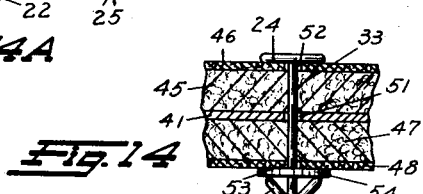
Figure 14 is a fragmental sectional view showing dual pieces of finish material held one on each side of a support by a fastener of the type shown in Figures 10, 11 and 12.

A further application of a fastener of Figures 10, 11 and 12 is illustrated in Figure 14 wherein dash 41 is provided on the front thereof with a silencer pad 45 upon which is superposed a trim panel 46. To the rear of dash 41 is disposed a second silencer pad 47 having a trim panel 48 superposed thereupon. In applied position the legs of the fastener are accommodated within apertures 51, 52 and 53 provided in the dash and front and rear trim panels respectively, and the tips of hooks 35 and 36 are observed to contact a washer 54 located concentrically with respect to the legs of the fastener and abutting the remote face of trim panel 48. Both of the silencer pads and trim panels are thus retained in assembled relation upon the dash by the action of the fastener head against the front trim panel 46, and the reaction of the fastener tips against the washer abutting the remote trim panel 48. Of course, the fastener of Figures 4, 5 and 6, or that of Figures 7, 8 and 9 may be used in the combination illustrated in Figure 14, instead of that of Figures 10, 11 and 12 which is included in the combination illustrated in Figure 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A spring stud fastener for securing a silencer pad and finish material or the like to a support having an aperture, consisting of a head designed to engage the finish material and a shank formed to pass through said pad and said aperture, said shank consisting only of two legs constructed of wire and spaced apart to contact with substantially diametrically opposite points of the wall defining said aperture, the ends of said legs being U-shaped providing hooks opening toward said head, each hook having a normal width exceeding the diameter of said aperture.

2. A spring stud fastener having a disk-like head and a shank consisting only of two straight parallel wire legs, each of which has a U-shaped end providing a hook opening toward the head, said legs being spaced apart sufficiently so that said U-shaped ends are disposed side by side and so that the free end of each hook is beside the leg which does not carry it, whereby tangling of the fasteners because of protruding ends is avoided.

BION C. PLACE.